US012742137B2

(12) United States Patent
Astolfi et al.

(10) Patent No.: US 12,742,137 B2
(45) Date of Patent: Sep. 22, 2026

(54) SOAP COMPOSITION

(71) Applicant: Conopco, Inc., Englewood Cliffs, NJ (US)

(72) Inventors: Rafael Astolfi, São Paulo (BR); Sergio Roberto Leopoldino, São Paulo (BR); Daniel DaRin Ponte, Wallingford, CT (US); Yuriy Konstantinovich Yarovoy, Monroe, CT (US)

(73) Assignee: Conopco Inc., Hoboken, NJ (US)

( * ) Notice: Subject to any disclaimer, the term of this patent is extended or adjusted under 35 U.S.C. 154(b) by 1011 days.

(21) Appl. No.: 17/798,335

(22) PCT Filed: Jan. 26, 2021

(86) PCT No.: PCT/EP2021/051721

§ 371 (c)(1),
(2) Date: Aug. 9, 2022

(87) PCT Pub. No.: WO2021/164994

PCT Pub. Date: Aug. 26, 2021

(65) Prior Publication Data

US 2023/0073393 A1 Mar. 9, 2023

(30) Foreign Application Priority Data

Feb. 20, 2020 (EP) .................................... 20158508

(51) Int. Cl.

| | |
|---|---|
| ***C11D 9/00*** | (2006.01) |
| ***C11D 9/10*** | (2006.01) |
| ***C11D 9/26*** | (2006.01) |

(52) U.S. Cl.
CPC ................ *C11D 9/007* (2013.01); *C11D 9/10* (2013.01); *C11D 9/262* (2013.01)

(58) Field of Classification Search
CPC ........... C11D 9/007; C11D 9/10; C11D 9/262; C11D 9/02; C11D 13/18
See application file for complete search history.

(56) References Cited

U.S. PATENT DOCUMENTS

| | | | | |
|---|---|---|---|---|
| 2,792,348 A * | 5/1957 | Aylesworth | C11D 9/02 510/481 |
| 3,503,887 A | 3/1970 | Beebe | |
| 6,846,787 B1 | 1/2005 | Farrell et al. | |
| 8,492,323 B2 | 7/2013 | Astolfi et al. | |

FOREIGN PATENT DOCUMENTS

| | | |
|---|---|---|
| CN | 104745331 | 7/2015 |
| CN | 105219559 | 1/2016 |
| CN | 106520416 | 3/2017 |
| CN | 106916658 | 7/2017 |
| EP | 0042647 | 12/1981 |
| EP | 0042648 | 12/1981 |
| EP | 2592134 | 5/2013 |
| JP | 2002038198 | 2/2002 |
| WO | WO2004108877 | 12/2004 |
| WO | WO2018222629 | 12/2018 |
| WO | WO2020177988 | 9/2020 |

OTHER PUBLICATIONS

FDA-Cottonseed oil (Year: 1979).*
Y.H. Hui; Bailey's Industrial Oil and Fat Products; Jun. 2001; p. 596, with English translation; Fifth Edition, vol. 2; China Light Industry Press; China.
Y.H. Hui; Bailey's Industrial Oil and Fat Products; Jun. 2001; p. 36, with English translation; Fifth Edition, vol. 1; China Light Industry Press; China.
Wang Jinling; Soybeans; Heilongjiang Science and Technology Press; May 31, 1982; pp. 73 with English translation; China.
Yao Jing et al.; Pharmaceutical Excipients Application Guide; China Medical Science and Technology Press; Aug. 2011; pp. 84, with English translation; China.
Search Report and Written Opinion in EP20158508; Sep. 16, 2020; European Patent Office (EPO).
Anonymous; Cottonseed oil; Wikipedia; Jul. 13, 2020; pp. 1-8, XP055728807, retrieved from the internet on Sep. 8, 2020: https://en.wikipedia.org/wiki/Cottonseed_oil.
R. L. Logan; Tall Oil Fatty Acids; J. Am. Oil Chemists' Soc.; Nov. 1979; pp. 777A-779A, XP055728815, retrieved from the internet on Sep. 8, 2020: https://aocs.onlinelibrary.wiley.com/doi/abs/10.1007/BF02667443; vol. 56.
Search Report and Written Opinion in PCTEP2021051721; Apr. 26, 2021; World Intellectual Property Org. (WIPO).
N.N.; Final Report on the Safety Assessment of Hydrogenated Cottonseed Oil, Cottonseed (*Gossypium*) Oil, Cottonseed Acid, Cottonseed Glyceride, and Hydrogenated Cottonseed Glyceride; International Journal of Toxicology; Jan. 1, 2001; pp. 21-29, XP055795691; Retrieved from the Internet: URL:http://journals.sagepub.com/doi/pdf/10.1080/10915810175030093 71> ; vol. 20 No. 2; Cosmetic Ingredient Review.

(Continued)

*Primary Examiner* — Andrew J. Oyer
(74) *Attorney, Agent, or Firm* — Krista J. Aiello

(57) ABSTRACT

Disclosed is a composition comprising C16:2-C18:2 soap; and C16:1-C18:1 soap; wherein a weight ratio of C16:2-C18:2 soap to C16:1-C18:1 soap in the composition is higher than 0.7. Also contemplated are end use compositions comprising the same.

12 Claims, No Drawings

(56) References Cited

OTHER PUBLICATIONS

IPRP2 in PCTEP2021051721; Mar. 21, 2022; World Intellectual Property Org. (WIPO).
Written Opinion 2 in PCTEP2021051721; Jan. 27, 2022; World Intellectual Property Org. (WIPO).
List et al., Low trans Spread and Shortening Oils via Hydrogenation of Soybean Oil, Journal of the American Oil Chemists' Society, vol. 84, issue 6, pp. 609-612; May 30, 2007.
Mert et al., Rheological and Microscopic Properties of Fat Blends with Similar Solid Fat Content but Different Trans Composition, J Am Oil Soc, vol. 90, pp. 17-26; Aug. 2012.
Monsanto Improved Fatty Acid Profile MON 87705 Soybean, US Dept of Agriculture, 88 Pages; Sep. 2011.

* cited by examiner

SOAP COMPOSITION

CROSS REFERENCE TO RELATED APPLICATIONS

The present application is a U.S. National Phase Application under 35 U.S.C. § 371 of International Application No. PCT/EP2021/051721, filed on Jan. 26, 2021, which claims priority to European Patent Application No. 20158508.0, filed on Feb. 20, 2020, the contents of which are incorporated herein in their entireties.

FIELD OF THE INVENTION

The invention relates to fatty acid soap composition, more particularly to soap bars made by a rapid extrusion process. More particularly, it relates to bars prepared from non-conventional oils (or mixture of specific fatty acids) without compromising on speed of bar production and bar properties like hardness, lather, rate of wear, stickiness and mildness on skin.

BACKGROUND OF THE INVENTION

Surfactants have been used for personal wash applications for a long time. There are many category of products in the personal wash market e.g. body wash, face wash, hand wash, soap bars, shampoos etc. Products which are marketed as body wash, face wash and shampoos are generally in liquid form and are made of synthetic anionic surfactants. They are generally sold in plastic bottles/containers. Soap bars and hand wash products generally contain soaps. Soap bars do not need to be sold in plastic containers and are able to retain their own shape by virtue of being structured in the form of a rigid solid. Soaps bars are usually sold in cartons made of cardboard.

Soap bars are generally prepared through one of two routes. One is called the cast bar route while the other is called the milled and plodded route (also known as extrusion route). The cast bar route has inherently been very amenable in preparing low TFM (total fatty matter) bars. Total fatty matter is a common way of defining the quality of soap. TFM is defined as the total amount of fatty matter, mostly fatty acids, that can be separated from a sample of soap after splitting with a mineral acid, usually hydrochloric acid. In the cast bar soaps, the soap mixture is mixed with polyhydric alcohols and poured in casts and allowed to cool and then the soap bars are removed from the casts. The cast bar route enables production at relatively lower throughput rates.

In the milled and plodded route, the soap is prepared with high water content and then spray dried to reduce the moisture content and to cool the soap after which other ingredients are added and then the soap is extruded through a plodder and optionally cut and stamped to prepare the final soap bar. The milled and plodded soaps generally have a high TFM in the range of 60 to 80 weight percent.

Milled and plodded soap bars are also known as extruded soap bars. They are composed of very many different types of soaps. Most soap compositions comprise both water insoluble as well as water soluble soaps. Their structure is generally characterized by a brick and mortar type structure. Insoluble soaps (called bricks) usually consist of higher chain $C_1$ and $C_{18}$ soaps (palmitate and stearate soap). They are generally included in soap bars to provide structuring benefits i.e., they provide shape to the bars. Soap bars also consist of water soluble soaps (which act as the mortar) which are generally unsaturated C18:1 and 18:2 sodium soap (oleate soap) in combination with short chain fatty acids (generally C to $C_{12}$ or even up to $C_{14}$ soap). Water soluble soaps generally aid in cleaning.

Soaps are generally prepared by saponification of oils or neutralisation of fatty acids or fatty acid mixture. The source of the oils or DFA (distilled fatty acids) could be from natural (plant or animal sources) or from petroleum feedstocks. More preferred source is natural sources like oils from coconut, palm, palm kernel, palm strearin or from animal sources like tallow/lard. The present invention relates to a soap bar composition which is prepared from alternative sources of oil or DFA. Such alternative sources may be used when the conventional sources are unavailable due to poor agricultural yields, or due to any natural calamity or due to business exigencies of export control or transportation issues, any of which may limit availability of conventional sources. The most common sources are palm oil which is sourced from south east Asian countries like Indonesia or Malaysia. When alternative sources of oils are used for making soap, it is often a challenge to tailor the combination of various (saturated and unsaturated fatty acids with the various chain lengths) many of which provide contrasting bar properties. For example, when the bar is prepared with very low amount of short chain fatty acid ($C_8$ to $C_{12}$) soaps, the bars tend to produce unacceptably low amount of lather. In improving the lather, if the short chain fatty acid soaps are substituted with an equivalent amount of higher ($C_{16}$-$C_{18}$) chain length unsaturated fatty acid soaps, the lather improves but the soap is found to be too soft to be processable into bars using a high speed extruder. It was thus a challenge to utilize the available fatty acid stocks from unconventional oils and yet prepare bars which meet all of the consumer desired properties and could be processable using a high speed extruder. The present inventors when looking for such alternate sources unexpectedly found that a specific mixture of unsaturated fatty acid when present in a particular ratio range along with the conventional “brick” forming fatty acid soaps like stearates and palmitates provides the desired hardness, lather, stability and other characteristics generally expected from conventional soap bars. The new inventive soaps can be prepared using low or no amount of oils like palm oil, coconut oil, palm kernel oil, tallow, palm olein or palm stearin. The present inventors have found that this can be achieved starting predominantly with soya bean oil. Alternately the soap of the present invention may additionally include soaps prepared from unconventional oil sources like corn, rice bran, cottonseed, and safflower.

Soya bean oil has been used in the past but the inventive step here is the need to have minimal or no amount of short chain fatty acid soap while ensuring (non-obvious) specific ratio ranges of linoleic to oleic acid soap and preferred specific ratio of saturated $C_{16}$:$C_{18}$ soap. This is achieved by judiciously using raw soya bean oil in admixture with hydrogenated and bleached soya bean oil.

Soaps prepared using soya bean oil and peanut oil which have high amounts of linoleic (C18:2) acid have been prepared before. CN104745331 discloses a natural herbal soap which is prepared from the following raw materials by weight: 50-65 parts of natural soap base and 30-40 parts of herbal extract. Certain examples of this patent disclose use of only soya bean oil soap and peanut oil soap as the soaps therein. These soaps are finally produced in powder form. Such soaps cannot be extruded into bars using a high speed extrusion process of the present invention. CN106916658 discloses a herbicidal soap characterized by a saponification component, a cleansing reinforcing component, and a saponin-removing medicinal component: a saponified component is a saponified product of soybean oil, lard and sodium hydroxide; a clean reinforcing component which is a mixture of a nonionic surfactant, an amphoteric surfactant and a herbicide; the herbicidal Chinese medicine component which is a mixture of tea tree essential oil and safflower extract. The soap in this published patent has saturated $C_{16}$ to $C_{24}$ soap (from a mixture of lard and soya bean oil as the oils used to make the soap) at a maximum of 20% and such soaps also cannot be extruded in high speed extruder.

U.S. Pat. No. 6,846,787 discloses bar composition which are structured in such manner (i.e. through specific ternary system) that bars can extrude well and have good properties (e.g. lather), even at low synthetic surfactant level. The bars disclosed therein are shown to be extruded well in a high speed extruder, but this property has been shown to be achieved through a judicious mixture of soap, fatty acid and synthetic surfactant and not through specific ratio of unsaturated soaps (oleic and linoleic soaps).

U.S. Pat. No. 2,792,348 discloses a process for the manufacture of solid soaps in the form of bars, flakes, or powder.

WO 2018/222629 discloses cleansing compositions including 0.01 wt % to 26 wt % of a neutralized tall oil fatty acid, 0.01 to 9 wt % of a solvent, and 65 to 99.8 wt % of water, where all weight percent values are based on a combined weight of the neutralized tall oil fatty acid, the solvent, and the water.

US842323 discloses soap bars with improved lather. By limiting amounts of myristic acid and keeping specifically defined ratios of $C_8$-$C_{10}$ fatty acids to $C_{12}$ fatty acid, bars having substantially improved lather were unexpectedly obtained.

It is thus an object of the present invention to provide for a soap bar that has excellent lather and provides the desired structural integrity to be processable in a high speed extruder while using soap from unconventional sources.

SUMMARY OF THE INVENTION

The first aspect of the present invention relates to a composition comprising:

C16:2-C18:2 soap; and

C16:1-C18:1 soap;

wherein a weight ratio of C16:2-C18:2 soap to C16:1-C18:1 soap in the composition is higher than 0.7.

A preferred aspect of the present invention relates to a composition of the first aspect further comprising (a) 40 to 90% $C_{16}$ to $C_{24}$ saturated soap by weight of the composition;

(b) 0.5 to 30% $C_{18}$ unsaturated soap by weight of the composition; and (c) less than 15% of $C_8$ to $C_{12}$ soap by weight of the composition;

wherein weight ratio of linoleic acid (C18:2) soap to oleic acid (C18:1) soap is higher than 0.7.

It is preferred that the composition of the present invention is a soap bar composition.

DETAILED DESCRIPTION OF THE INVENTION

These and other aspects, features and advantages will become apparent to those of ordinary skill in the art from a reading of the following detailed description and the appended claims. For the avoidance of doubt, any feature of one aspect of the present invention may be utilized in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description and claims indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

The present invention relates to a soap composition, preferably a soap bar composition. By a soap bar composition is meant a cleansing composition comprising soap which is in the form of a shaped solid. The soap bar of the invention is useful for cleaning any surface e.g. those used for cleaning clothes (e.g. laundering) or for personal cleansing. It is especially useful for personal cleansing.

The soap composition comprises C16:2-C18:2 soap; and C16:1-C18:1 soap; wherein weight ratio of C16:2-C18:2 soap to C16:1-C18:1 soap in the composition is higher than 0.7. It is particularly preferred that the weight ratio of linoleic acid (C18:2) soap to oleic acid (C18:1) soap is higher than 0.7.

The composition of the invention preferably comprises at least 50 wt % C16:2-C18:2 soap and at least 50 wt % C16:1-C18:1 soap, based on the % by weight of the composition. More preferably, the composition comprises at least 75 wt % C16:2-C18:2 soap and at least 75 wt % C16:1-C18:1 soap; further more preferably the composition comprises at least 90 wt % C16:2-C18:2 soap and at least 90 wt % C16:1-C18:1 soap, even more preferably wherein the composition comprises at least 95 wt % C16:2-C18:2 soap and at least 95 wt % C16:1-C18:1 soap.

The composition comprises C16:2-C18:2 soap which comprises at least 50 wt % linoleic acid (C18:2) soap, preferably at least 75 wt % linoleic acid soap, based on the % by weight of the composition, more preferably at least 90 wt % linoleic acid soap, even more preferably 95 wt % linoleic acid soap, still more preferably 100 wt % linoleic acid soap. The composition comprises C16:1-C18:1 soap which comprises at least 50 wt % oleic acid (C18:1) soap, preferably at least 75 wt % oleic acid soap, more preferably at least 90 wt % oleic acid soap, even more preferably, at least 95 wt % oleic acid soap, and still more preferably, 100 wt % oleic acid, wherein the weight ratio of linoleic acid to oleic acid is higher than 0.7

The composition of the first aspect preferably includes soaps other than the C16:2-C18:2 soap and the C16:1-C18:1 soap at less than 10 wt %, more preferably less than 5 wt %, further more preferably less than 1 wt %, and optimally absent from the composition, based on the % by weight of the composition.

It is preferred that the composition of the present invention is formulated as a soap bar composition by including other ingredients to structure it in the form of a bar.

Such a preferred aspect of the soap bar composition comprises (a) 40 to 90% $C_{16}$ to $C_{24}$ saturated soap by weight of the composition;

(b) 0.5 to 30% $C_{18}$ unsaturated soap by weight of the composition; and (c) less than 15% of $C_8$ to $C_{12}$ soap by weight of the composition;

wherein weight ratio of linoleic acid (C18:2) soap to oleic acid (C18:1) soap is higher than 0.7.

The soap bar of the present invention preferably comprises 40 to 95% soap, preferably 40 to 90%, more preferably 50 to 85% soap by weight of the soap bar composition. The term soap means salt of fatty acid. Preferably, the soap is soap of $C_8$ to $C_{24}$ fatty acids, more preferably comprising more than 90% of $C_{16}$ to $C_{20}$ soap, by total weight of the soap.

The cation may be an alkali metal, alkaline earth metal or ammonium ion, preferably alkali metals. Preferably, the cation is selected from sodium or potassium, more preferably sodium. In some aspects of the invention it is preferably a mixture of sodium and potassium soap. In such cases, potassium soap is included in up to a maximum of 20 wt % of the total amount of soap. The soap of the present invention is a judicious mixture of saturated and unsaturated soap.

The soap may be obtained by saponification of oils, fats or fatty acids. The fats or oils generally used to make the soap bars of the present invention are selected from soya bean oil which is a judicious mixture hydrogenated fractions and raw oil. It is also possible to blend a portion of such soap with soap of castor oil.

The soap bar may additionally comprise synthetic surfactants selected from one or more from the class of anionic, non-ionic, cationic or zwitterionic surfactants, preferably from anionic surfactants. These synthetic surfactants, as per the present invention, are included in less than 20%, preferably less than 15%, further more preferably less than 10%, furthermore preferably less than 5%, and most preferably less than 1%, all percentages are by weight of the composition and sometimes the synthetic surfactant is absent from the composition.

The composition of the present invention is in the form of a shaped solid for example a bar. The cleaning soap composition is a wash off product that generally has a sufficient amount of surfactants included therein that it is used for cleansing the desired surface like topical surface e.g. the whole body, the hair and scalp or the face. It is applied on the topical surface and left thereon only for a few seconds or minutes and washed off thereafter with copious amounts of water. Alternately it may be used for laundering clothes. The soap bar is usually rubbed on to the wet clothes, optionally brushed and then rinsed with water to remove the residual soap and dirt.

The soap bars of the present invention include saturated $C_{16}$ to $C_{24}$ soap, preferably, 40 to 90% saturated $C_{16}$ to $C_{24}$ soaps, by weight of the composition. Saturated soaps for inclusion in the present invention are preferably $C_{16}$ to $C_{20}$, furthermore preferably $C_{16}$ to $C_{18}$ saturated soap i.e. it is most preferably a mixture of palmitic and stearic acid soaps. Saturated soap in the present inventive soap bar comprises at least 50 or 55 or 60 or 70 wt % at the lower end of the range and at the most 90 or 85 or 80 wt % at the upper end, any lower end point may be combined with any upper end point to define a preferred range. The saturated soap for inclusion in the present invention may be prepared by saponification of any oil source like fractions of vegetable oil or animal fat or by neutralisation of a DFA (distilled fatty acid) mixture available in the market. Preferably the saturated fatty acid for use in the present invention is prepared by hydrogenation of soya bean oil which may preferably be bleached.

It is especially preferred that the soap bar composition of the invention comprises both stearic acid soap and palmitic acid soap wherein the weight ratio of palmitic acid soap to stearic acid soap is in the range of 1:2 to 5:1, preferably in the range of 1:1 to 2:1. In another preferred aspect the soap bar includes stearic acid soap at 20 to 90%, preferably 20 to 70%, further more preferably 30 to 40% by weight of the total amount of stearic acid soap and palmitic acid soap.

The soap bars of the present invention preferably include a low amount of low molecular weight soaps ($C_8$ to $C_{12}$ soaps) which are generally water soluble. Such low molecular weight soaps are preferably included in the bar composition of the present invention in less than 15%, more preferably less than 10%, furthermore preferably less than 5%, even more preferably less than 1% by weight of the composition.

The soap bar of the invention includes unsaturated $C_{18}$ fatty acid at 0.5% to 30% by weight of the soap bar. The unsaturated fatty acid soaps included in the bar of the present invention are those having one, two or three unsaturated groups, preferably includes fatty acids having one and two unsaturated groups. $C_{18}$ fatty acid with one unsaturated group is known as oleic acid while that with two unsaturated groups is known as linoleic acid. It is especially important as per the present invention that the soap bar includes both oleic acid as well as linoleic acid soap such that the weight ratio of linoleic acid to oleic acid is higher than 0.7. This ratio is preferably higher than 1.0. It is preferred that the ratio is in the range of 0.7 to 4.0, more preferably in the range of 1.0 to 2.5, furthermore preferably in the range of 1.0 to 2.0. The present inventors through extensive experimentation have found that this is a very carefully crafted ratio range over which most of the desired properties are obtained. If this ratio is too low, the bar is found to provide poor lather. If the ratio is too high, the bars are found to be inferior in long term stability at elevated temperatures. It is preferred that the total amount of linoleic and oleic acid soap in the soap bar composition of the invention is at least 0.5% or 5% or 10% or 15 wt % at the lower end of the limit and at the most 30%, or 26% or 20 wt % at the upper end, any one of the limits at the lower end may be combined with any limit at the upper end to define a preferred range. Furthermore, the soaps prepared from many naturally occurring oils also contain C18:3 fatty acid which is also known as linolenic acid. This is a fatty acid having three unsaturated bonds. It is preferred that the soap composition of the present invention comprises low amount of C18:3 soaps, preferably less than 2 wt %, furthermore preferably less than 1 wt %. Presence of high amounts of C18:3 fatty acid soaps leads to instability of the composition. The total amount of the unsaturated soaps in the above mentioned ranges is also found to be important. If this amount is too high, the soap bar is found to be sticky and not easily stampable. If this amount is too low, the bar is too hard and does not have the desired rate of wear. Thus, an especially preferred aspect of the present invention is that compared to conventional soap bars which contain higher than 35 wt % unsaturated $C_{18}$ soap, the soaps of the present invention contain less than 30% while most soaps can be prepared with less than 26 wt % of unsaturated $C_{18}$ soaps. Such soap bar compositions are thus found to be more stable. An additional advantage of the present invention is that the soap bars prepared as per the invention are found to be mild on skin when used for personal washing. The mildness of the soap bars is determined by measuring the zein dissolution number.

It is preferred that the fatty acid soap blend may be finetuned to get the desired properties by reducing the amount of unsaturated fatty acid soap and replacing that with ricinoleic acid soap. Ricinoleic acid is a $C_{18}$ fatty acid having a hydroxyl group in the alkyl chain. It is predominantly present in castor oil based fatty acids. It preferred that when included, the soap bar composition of the invention comprises up to 15%, preferably up to 10%, furthermore preferably up to 5% ricinoleic acid soap by total weight of the soap composition. If the amount of ricinoleate soap is too high, it is found that the soap bar is sticky and does not produce the desired amount of lather.

Since the object of the present invention is to minimize use of conventional soap making oils/fatty acid blends, it is preferred that the soap bar composition comprises less than 5 wt % soap prepared from one or more of palm oil, palm kernel oil, coconut oil, tallow, palm olein or palm stearin, more preferred aspect is to include less than 1 wt % of such oils and optimally such oils are absent from the soap bar composition.

It is also possible to replace a part of the soaps with solvent like polyhydric alcohol (also called polyol) or mixture of polyols. Polyol is a term used herein to designate a compound having multiple hydroxyl groups (at least two, preferably at least three) which is highly water soluble. Many types of polyols are available including: relatively low molecular weight short chain polyhydroxy compounds such as glycerol and propylene glycol; sugars such as sorbitol, manitol, sucrose and glucose; modified carbohydrates such as hydrolyzed starch, dextrin and maltodextrin, and polymeric synthetic polyols such as polyalkylene glycols, for example polyoxyethylene glycol (PEG) and polyoxypropylene glycol (PPG). Especially preferred polyols are glycerol, sorbitol and their mixtures. Most preferred polyol is glycerol. In a preferred embodiment, the bars of the invention comprise 0 to 10%, preferably 1 to 10%, more preferably 1 to 7.5% by wt. polyol. (e.g. glycerine). This can also reduce the costs of the bar and could also bring additional benefits for consumers, such as mildness.

Electrolytes are preferably included in the soap bar composition of the invention. Electrolytes include compounds that substantially dissociate into ions in water. Electrolytes as per this invention are not ionic surfactants. Suitable electrolytes for inclusion in the soap making process are alkali metal salts. Preferred alkali metal salts for inclusion in the composition of the invention include sodium sulfate, sodium chloride, sodium acetate, sodium citrate, potassium chloride, potassium sulfate, sodium carbonate and other mono or di or tri salts of alkaline earth metals, more preferred electrolytes are sodium chloride, sodium sulfate, sodium citrate, potassium chloride and especially preferred electrolyte is sodium chloride, sodium citrate or sodium sulphate or a combination thereof. In total, the electrolyte is preferably included in 0.1 to 8%, more preferably 0.5 to 6%, even more preferably 0.5 to 5%, furthermore preferably 0.5 to 3%, and most preferably 1 to 3% by weight of the composition. Water is preferably included in the bars of the invention. Water is preferably in the range of 8 to 22% by weight of the composition.

In addition to the above, the soap bars optionally comprise 0.05 to 35 wt % structurants other than water insoluble saturated soaps. Suitable structurants are starches, sodium carboxymethylcellulose, inorganic particulate matter (e.g., talc, calcium carbonate, zeolite and mixtures of such particulates) and mixtures thereof.

The soap bar composition may optionally comprise 2 to 15%, preferably 4 to 12% by weight of free fatty acids. By free fatty acids is meant a carboxylic acid comprising a hydrocarbon chain and a terminal carboxyl group bonded to an H. Suitable fatty acids are $C_8$ to $C_{22}$ fatty acids. Preferred fatty acids are $C_{12}$ to $C_{18}$, preferably predominantly saturated, straight-chain fatty acids. However, some unsaturated fatty acids can also be employed.

The various optional ingredients that make up the final soap bar composition are as described below:

The total level of the adjuvant materials used in the bar composition is generally in an amount not higher than 50%, preferably 1 to 50%, more preferably 3 to 45% by wt. of the soap bar composition.

Suitable starchy materials which may be used include natural starch (from corn, wheat, rice, potato, tapioca and the like), pre-gelatinized starch, various physically and chemically modified starch and mixtures thereof. By the term natural starch is meant starch which has not been subjected to chemical or physical modification—also known as raw or native starch. The raw starch can be used directly or modified during the process of making the bar composition such that the starch becomes gelatinized, either partially or fully gelatinized.

The adjuvant system may optionally include insoluble particles comprising one or a combination of materials. By insoluble particles is meant materials that are present in solid particulate form and suitable for personal washing. Preferably, there are mineral (e.g., inorganic) or organic particles.

The insoluble particles should not be perceived as scratchy or granular and thus generally has a particle size less than 300 microns, more preferably less than 100 microns and most preferably less than 50 microns.

Preferred inorganic particulate material includes talc and calcium carbonate. Talc is a clay mineral composed of hydrated magnesium silicate with the chemical formula $Mg_3Si_4O_{10}(OH)_2$ and may be available in the hydrated form. It has a plate-like morphology, and is essentially oleophilic/hydrophobic, i.e., it is wetted by oil rather than water.

Calcium carbonate or chalk exists in three crystal forms: calcite, aragonite and vaterite. The natural morphology of calcite is rhombohedral or cuboidal, acicular or dendritic for aragonite and spheroidal for vaterite.

Examples of other optional insoluble inorganic particulate materials include aluminates, silicates, phosphates, insoluble sulfates, and clays (e.g., kaolin, china clay) and their combinations.

Organic particulate materials include: insoluble polysaccharides such as highly crosslinked or insolubilized starch (e.g., by reaction with a hydrophobe such as octyl succinate) and cellulose; synthetic polymers such as various polymer lattices and suspension polymers; insoluble soaps and mixtures thereof.

Bar compositions preferably comprise 0.1 to 25% by wt. of bar composition, preferably 5 to 15 by wt. of these mineral or organic particles.

An opacifier may be optionally present in the personal care composition. When opacifiers are present, the cleansing bar is generally opaque. Examples of opacifiers include titanium dioxide, zinc oxide and the like. A particularly preferred opacifier that can be employed when an opaque soap composition is desired is ethylene glycol mono- or di-stearate, for example in the form of a 20 wt % solution in sodium lauryl ether sulphate. An alternative opacifying agent is zinc stearate.

The product can take the form of a water-clear, i.e. transparent soap, in which case it will not contain an opacifier.

The pH of preferred soaps bars of the invention is from 8 to 11, more preferably 8 to 10.5, most preferably from 8.5 to 10.5.

A preferred bar may additionally include up to 30 wt % benefit agents. Preferred benefit agents include moisturizers, emollients, sunscreens and anti-ageing compounds. The agents may be added at an appropriate step during the process of making the bars. Some benefit agents may be introduced as macro domains.

Other optional ingredients like anti-oxidants, perfumes, polymers, chelating agents, colourants, deodorants, dyes, enzymes, foam boosters, germicides, anti-microbials, lathering agents, pearlescers, skin conditioners, stabilizers or superfatting agents, may be added in suitable amounts in the process of the invention. Preferably, the ingredients are added after the saponification step. Sodium metabisulphite, ethylene diamine tetra acetic acid (EDTA), or ethylene hydroxy diphosphonic acid (EHDP) are preferably added to the formulation. Fat soluble skin care actives like retinoids or resorcinols may also be included in the soap bar composition of the invention. Water soluble skin lightening agents like Vitamin B3 may also be included.

The composition of the invention could be used to deliver antimicrobial benefits. Antimicrobial agents that are preferably included to deliver this benefit include oligodynamic metals or compounds thereof. Preferred metals are silver, copper, zinc, gold or aluminium. Silver is particularly preferred. In the ionic form it may exist as a salt or any compound in any applicable oxidation state. Preferred silver compounds are silver oxide, silver nitrate, silver acetate, silver sulfate, silver benzoate, silver salicylate, silver carbonate, silver citrate or silver phosphate, with silver oxide, silver sulfate and silver citrate being of particular interest in one or more embodiments. In at least one preferred embodiment the silver compound is silver oxide. Oligodynamic metal or a compound thereof is preferably included in 0.0001 to 2%, preferably 0.001 to 1% by weight of the composition. Alternately an essential oil antimicrobial active may be included in the composition of the invention. Preferred essential oil actives which may be included are terpineol, thymol, carvacrol, (E)-2(prop-1-enyl) phenol, 2-propylphenol, 4-pentylphenol, 4-sec-butylphenol, 2-benzyl phenol, eugenol or combinations thereof. Furthermore, preferred essential oil actives are terpineol, thymol, carvacrol or thymol, most preferred being terpineol or thymol and ideally a combination of the two. Essential oil actives are preferably included in 0.001 to 1%, preferably 0.01 to 0.5% by weight of the composition. Alternately other popularly used antimicrobial actives like chloroxylenol, trichlorocarban or benzalkonium chloride may be included.

The soap composition may be made into a bar by a process that first involves saponification of the fat charge with alkali followed by extruding the mixture in a conventional plodder. The plodded mass may then be optionally cut to a desired size and stamped with a desirable indicia. An especially important benefit of the present invention is that the soap bar compositions thus prepared by extrusion are found to be easy to stamp with a desirable indicia. It is possible to prepare the soap bars of the invention in a high speed extruder where typically more than 200 bars/minute are extruded and stamped.

The invention will now be illustrated by means of the following non-limiting examples.

EXAMPLES

The constituents in all the tables below are given in wt % as present in that sample, unless it is a property that has been measured, in which case the units of the property are indicated therein.

Examples A-C, 1-5: Effect of Ratio of C18:2 to C18:1 on the Bar Properties

The following soaps were prepared using the following fat charge as shown in Table-1

TABLE 1

| Examples → Fat charge | A | B | C | 1 | 2 | 3 | 4 | 5 |
|---|---|---|---|---|---|---|---|---|
| Palm oil (IV 55) | 40.0 | — | — | — | — | — | — | — |
| Palm oil stearin IV 35) | 40.0 | — | — | — | — | — | — | — |
| Palm kernel oil (IV 18) | 20.0 | — | — | — | — | — | — | — |
| Capric-Lauric algal oil | — | — | — | — | — | — | — | 15.0 |
| Lauric acid | — | — | — | — | 10.0 | — | — | — |
| RBD Soya Bean oil (IV 134) | — | 19.3 | 17.9 | 22.0 | 25.0 | 25.0 | 25.0 | 15.0 |
| Oleic acid | — | 20.1 | 27.0 | 8.5 | — | — | — | — |
| Fully hydrogenated soya bean oil (IV 0.9) | — | 60.6 | 55.1 | 69.5 | 65.0 | 75.0 | 75.0 | 70.0 |

The above soaps were formulated along with other ingredients and the formulations are given in the Table-2A below along with the information of the various types of fatty acid soaps present in each (Table-2B).

TABLE 2A

| Ingredient | A | B | C | 1 | 2 | 3 | 4 | 5 |
|---|---|---|---|---|---|---|---|---|
| Soap | 74.01 | 74.61 | 74.61 | 74.61 | 74.61 | 67.61 | 76.99 | 73.68 |
| Chelating agent | 0.06 | 0.06 | 0.04 | 0.06 | 0.06 | 0.06 | 0.06 | 0.06 |
| Sodium chloride | 0.65 | 0.70 | 0.70 | 0.70 | 0.70 | 0.70 | 0.50 | 0.71 |
| Glycerine | 7.65 | 7.00 | 7.00 | 7.00 | 7.00 | 7.00 | 7.91 | 7.92 |
| Free fatty acid (via 0.16% citric acid) | — | — | — | — | — | 7.00 | 0.70 | — |
| Sodium citrate | — | — | — | — | — | — | 0.21 | — |
| Water, minors | To 100 | To 100 | To 100 | To 100 | To 100 | To 100 | To 100 | To 100 |

In the above table the chelating agent is a mixture of EHDP+EDTA in a weight ratio of 1:2.

Minors in the above table includes perfume, colour and other minor ingredients like opacifiers.

TABLE 2B

The soap used in the above formulation has the following constitution:

| Ingredient | A | B | C | 1 | 2 | 3 | 4 | 5 |
|---|---|---|---|---|---|---|---|---|
| C16 | 42.00 | 11.00 | 10.00 | 11.6 | 11.3 | 12.6 | 12.4 | 11.20 |
| C18 | 4.70 | 54.00 | 49.00 | 61.00 | 57.50 | 66.10 | 66.10 | 62.00 |
| C8-C12 | 15.28 | 0.58 | 0.72 | 0.33 | 10.1 | 0.2 | 0.13 | 11.80 |
| C18: 1 oleic | 30.8 | 20.00 | 26.00 | 12.00 | 5.62 | 5.62 | 6.00 | 5.00 |
| C18: 2 linoleic | 7.24 | 13.00 | 13.00 | 13.00 | 13.66 | 13.66 | 13.00 | 9.00 |
| Minors* | To 100 | To 100 | To 100 | To 100 | To 100 | To 100 | To 100 | To 100 |

*Minors in the above table includes minor long chain unsaturated fatty acids such as linolenic acid.

The above soaps bar formulations were passed through an extruder and the extrudability and stamping efficacy were noted. Additionally, the hardness of the soap bar was measured using the following protocol.

Hardness Testing Protocol

Principle

A 30° conical probe penetrates into a soap/syndet sample at a specified speed to a pre-determined depth. The resistance generated at the specific depth is recorded. There is no size or weight requirement of the tested sample except that the bar/billet be bigger than the penetration of the cone (15 mm) and have enough area. The recorded resistance number is also related to the yield stress and the stress can be calculated as noted below. The hardness (and/or calculated yield stress) can be measured by a variety of different penetrometer methods. In this invention, as noted above, we use probe which penetrates to depth of 15 mm.

Apparatus and Equipment

TA-XT Express (Stable Micro Systems)

30° conical probe—Part #P/30c (Stable Micro Systems)

Sampling Technique

This test can be applied to billets from a plodder, finished bars, or small pieces of soap/syndet (noodles, pellets, or bits). In the case of billets, pieces of a suitable size (9 cm) for the TA-XT can be cut out from a larger sample. In the case of pellets or bits which are too small to be mounted in the TA-XT, the compression fixture is used to form several noodles into a single pastille large enough to be tested.

Procedure

Setting Up the TA-XT Express

These settings need to be inserted in the system only once. They are saved and loaded whenever the instrument is turned on again. This ensures settings are constant and that all experimental results are readily reproducible.

Set Test Method

Press MENU

Select TEST SETTINGS (Press 1)

Select TEST TPE (Press 1)

Choose option 1 (CYCLE TEST) and press OK

Press MENU

Select TEST SETTINGS (Press 1)

Select PARAMETERS (Press 2)

Select PRE TEST SPEED (Press 1)

Type 2 (mm $s^{-1}$) and press OK

Select TRIGGER FORCE (Press 2)

Type 5 (g) and Press OK

Select TEST SPEED (Press 3)

Type 1 (mm $s^{-1}$) and press OK

Select RETURN SPEED (Press 4)

Type 10 (mm $s^{-1}$) and press OK

Select DISTANCE (Press 5)

Type 15 (mm) for soap billets or 3 (mm) for soap pastilles and press OK

Select TIME (Press 6)

Type 1 (CYCLE)

Calibration

Screw the probe onto the probe carrier.

Press MENU

Select OPTIONS (Press 3)

Select CALIBRATE FORCE (Press 1)—the instrument asks for the user to check whether the calibration platform is clear Press OK to continue and wait until the instrument is ready.

Place the 2 kg calibration weight onto the calibration platform and press OK

Wait until the message "calibration completed" is displayed and remove the weight from the platform.

Sample Measurements

Place the billet onto the test platform.

Place the probe close to the surface of the billet (without touching it) by pressing the UP or DOWN arrows.

Press RUN

Take the readings (g or kg) at the target distance (Fin).

After the run is performed, the probe returns to its original position.

Remove the sample from the platform and record its temperature.

Calculation & Expression of Results

Output

The output from this test is the readout of the TA-XT as "force" ($R_T$) in g or kg at the target penetration distance, combined with the sample temperature measurement. (In the subject invention, the force is measured in Kg at 40° C. at 15 mm distance)

The force reading can be converted to extensional stress, according to the equation below:

The equation to convert the TX-XT readout to extensional stress is $$\sigma = \frac{1}{C}\frac{R_T g_c}{A}$$

where: σ=extensional stress

C="constraint factor" (1.5 for 30° cone)

$G_c$=acceleration of gravity

A=projected area of cone=

$$\pi\left(d\tan\frac{1}{2}\theta\right)^2$$

d=penetration depth
θ=cone angle

For a 30° cone at 15 mm penetration Equation 2 becomes $$\sigma(Pa) = R_T(g) \times 128.8$$

This stress is equivalent to the static yield stress as measured by penetrometer.

The extension rate is $$\dot{\varepsilon} = \frac{V}{d\tan\left(\frac{1}{2}\theta\right)}$$

where $\dot{\varepsilon}$=extension rate ($s^{-1}$)
V=cone velocity

For a 30° cone moving at 1 mm/s, $\dot{\varepsilon}$=0.249 $s^{-1}$

Temperature Correction

The hardness (yield stress) of skin cleansing bar formulations is temperature-sensitive. For meaningful comparisons, the reading at the target distance ($R_T$) should be corrected to a standard reference temperature (normally 40° C.), according to the following equation:

$$R_{40} = R_T \times \exp[\alpha(T - 40)]$$

where $R_{40}$=reading at the reference temperature (40° C.)
$R_T$=reading at the temperature T
α=coefficient for temperature correction
T=temperature at which the sample was analyzed.

The correction can be applied to the extensional stress.

Raw and Processed Data

The final result is the temperature-corrected force or stress, but it is advisable to record the instrument reading and the sample temperature also.

A hardness value of at least 1.2 Kg (measured at 40° C.) is acceptable.

The data on hardness and the observation on extrudability is summarized in the Table-3 below along with the weight ratio of C18:2 to C18:1 as calculated from the table above.

TABLE 3

| Example | A | B | C | 1 | 2 | 3 | 4 | 5 |
|---|---|---|---|---|---|---|---|---|
| Weight ratio of linoleic acid: Oleic acid | 0.24 | 0.65 | 0.50 | 1.08 | 2.43 | 2.43 | 2.16 | 1.80 |
| Hardness at 40° C. (1 mm/s) | 4.12 | 1.33 | 1.17 | 2.66 | 2.62 | 3.56 | 2.69 | 3.55 |
| Extrudability | Good | Sticky | Sticky | Good | Good | Good | Good | Good |

The data in the above table indicates that the soap bar samples as per the invention (Examples 1 to 5 which are made with Soya bean oil blended with calculated amount of oleic acid and/or hydrogenated soya bean oil) gave acceptable hardness and good extrudability as compared to the control sample (Example A which is a soap bar made with saponification of a conventional oil). The importance of the weight ratio of linoleic acid to oleic acid (to be higher than 0.7) is brought out in the above table (Examples 1 to 5 as against Example B, C).

Examples 6-11: Effect of Weight Ratio of Palmitic Acid Soap (Saturated $C_{16}$):Stearic Acid Soap (Saturated $C_{18}$) in Bars within the Invention The following soaps were prepared using the following fat charge as shown in Table-4

TABLE 4

| Examples → Fat charge | 6 | 7 | 8 | 9 | 10 | 11 |
|---|---|---|---|---|---|---|
| RBD Soya Bean oil (IV 134) | 32 | 32 | 32 | 32 | 32 | 32 |
| Palmitic acid | — | 14 | 28 | 42 | 56 | 68 |
| Fully hydrogenated soya bean oil (IV 0.9) | 68 | 54 | 40 | 26 | 12 | — |

The above soaps were formulated along with other ingredients and the formulations are given in the Table-5A below along with the information of the various types of fatty acid soaps present in each (Table-5B).

TABLE 5A

| Ingredient | 6 | 7 | 8 | 9 | 10 | 11 |
|---|---|---|---|---|---|---|
| Soap | 76.01 | 76.01 | 76.01 | 76.01 | 76.01 | 76.01 |
| EHDP + EDTA | 0.06 | 0.06 | 0.06 | 0.06 | 0.06 | 0.06 |
| Sodium chloride | 0.65 | 0.65 | 0.65 | 0.65 | 0.65 | 0.65 |
| Glycerine | 7.00 | 7.00 | 7.00 | 7.00 | 7.91 | 7.92 |
| Water, minors | To 100 | To 100 | To 100 | To 100 | To 100 | To 100 |

Minors in the above table includes perfume, colour and other minor ingredients like opacifiers.

TABLE 5B

| Examples | 6 | 7 | 8 | 9 | 10 | 11 |
|---|---|---|---|---|---|---|
| C16 | 12.00 | 24.00 | 36.00 | 49.00 | 61.00 | 71.00 |
| C18 | 60.00 | 48.00 | 36.00 | 24.00 | 12.00 | 1.40 |
| C8-C12 | 0.12 | 0.15 | 0.18 | 0.21 | 0.24 | 0.27 |
| C18: 1 oleic | 8.23 | 8.23 | 8.23 | 8.23 | 8.23 | 8.23 |
| C18: 2 linoleic | 16.99 | 16.99 | 16.99 | 16.99 | 16.99 | 16.99 |
| Minors | To 100 | To 100 | To 100 | To 100 | To 100 | To 100 |

*Minors in the above table includes minor long chain unsaturated fatty acids such as linolenic acid.

The above soaps bar formulations were passed through an extruder and the extrudability and stamping efficacy were noted to be acceptable. Additionally, the hardness of the soap bar was measured using the above detailed protocol.

The data on hardness is summarized in the Table-6 below along with the weight ratio of saturated $C_{16}$ soap to saturated $C_{18}$ soap as calculated from the table above.

TABLE 6

| Example | 6 | 7 | 8 | 9 | 10 | 11 |
|---|---|---|---|---|---|---|
| Weight ratio of palmitic to stearic acid soap | 0.2 | 0.5 | 1.0 | 2.0 | 5.0 | 51.0 |
| Hardness at 40° C. (1 mm/s) | 1.70 | 2.21 | 5.29 | 6.18 | 3.73 | 1.38 |

The data in the above tables 5A, 5B and 6 indicates that all the soap bar samples as per the invention gave acceptable hardness and good extrudability. The data also indicates that a weight ratio of palmitic acid soap:stearic acid soap in the range of 1:2 to 5:1 is preferred.

Examples 12-14: Effect of Ratio of Sodium Soap:Potassium Soap in Bars within the Invention The following soaps were prepared using the following fat charge as shown in Table-7

TABLE 7

| | Examples | | |
|---|---|---|---|
| Fat charge | 12 | 13 | 14 |
| RBD Soya Bean oil (IV 134) | 32 | 32 | 32 |
| Palmitic acid | — | 42 | 56 |
| Fully hydrogenated soya bean oil (IV 0.9) | 68 | 26 | 12 |
| NaOH/KOH ratio | 80/20 | 80/20 | 80/20 |

The above soaps were formulated along with other ingredients and the formulations are given in the Table-8A below along with the information of the various types of fatty acid soaps present in each (Table-8B).

The above soaps bar formulations were passed through an extruder and the extrudability and stamping efficacy were noted to be acceptable. Additionally, the hardness of the soap bar was measured using the above detailed protocol, and the data on hardness is summarized in the same Table-8A.

TABLE 8A

| Ingredient | 12 | 13 | 14 |
|---|---|---|---|
| Soap | 76.01 | 76.01 | 76.01 |
| EHDP + EDTA | 0.06 | 0.06 | 0.06 |
| Sodium chloride | 0.65 | 0.65 | 0.65 |
| Glycerine | 7.65 | 7.65 | 7.65 |
| Water, minors | To 100 | To 100 | To 100 |
| Hardness at 40° C. (1 mm/s) | 1.63 | 1.67 | 1.39 |

Minors in the above table includes minor ingredients like perfume, colour and opacifiers

TABLE 8 B

| Ingredient | 12 | 13 | 14 |
|---|---|---|---|
| C16 | 12.00 | 49.00 | 61.00 |
| C18 | 60.00 | 24.00 | 12.00 |
| C8-C12 | 0.12 | 0.21 | 0.24 |
| C18:1 oleic | 8.23 | 8.23 | 8.23 |
| C18:2 linoleic | 16.99 | 16.99 | 16.99 |
| *Minors | To 100 | To 100 | To 100 |

*Minors in the above table includes minor long chain unsaturated fatty acids such as linolenic acid.

The data in the above Table 8A and 8B indicates that all the soap bar samples as per the invention gave acceptable hardness even when 20% of the soap is potassium soap.

Examples 15-18: Effect of Inclusion of Ricinoleate in the Soap Mix

The following soaps were prepared using the following fat charge as shown in Table-9

TABLE 9

| | Examples | | | |
|---|---|---|---|---|
| Fat charge | 15 | 16 | 17 | 18 |
| Castor oil | 5.00 | 10.00 | 15.00 | 10.00 |
| RBD Soya Bean oil (IV 134) | 14.53 | 11.41 | 8.33 | — |
| Fully hydrogenated soya bean oil (IV 0.9) | 80.47 | 78.59 | 76.67 | 90.00 |

The above soaps were formulated along with other ingredients and the formulations are given in the Table-10A below along with the information of the various types of fatty acid soaps present in each (Table-10B). The above soaps bar formulations were passed through an extruder and the extrudability and stamping efficacy were noted to be acceptable. Additionally, the hardness of the soap bar was measured using the above detailed protocol. The data on hardness is also summarized in the same Table-10A.

TABLE 10A

| Ingredient | 15 | 16 | 17 | 18 |
|---|---|---|---|---|
| Soap | 74.61 | 74.61 | 74.61 | 74.61 |
| EHDP + EDTA | 0.06 | 0.06 | 0.06 | 0.06 |
| Sodium chloride | 0.65 | 0.70 | 0.70 | 0.70 |
| Glycerine | 7.00 | 7.00 | 7.00 | 7.00 |
| Water, minors | To 100 | To 100 | To 100 | To 100 |
| Hardness at 40° C. (1 mm/s) | 2.00 | 2.29 | 2.97 | 4.70 |

Minors in the above table include minor ingredients like perfume, colour and opacifiers.

TABLE 10B

| Ingredient | 15 | 16 | 17 | 18 |
|---|---|---|---|---|
| C16 | 11.82 | 11.40 | 10.80 | 11.40 |
| C18 | 70.43 | 68.70 | 66.90 | 78.10 |
| C8-C12 | 0.14 | 0.14 | 0.14 | 0.15 |
| C18:1 oleic | 3.88 | 2.86 | 2.31 | 0.29 |
| C18:2 linoleic | 7.96 | 6.72 | 5.28 | 0.49 |
| C18:1 OH Ricinoleic | 4.55 | 9.11 | 13.66 | 9.11 |
| *Minors | To 100 | To 100 | To 100 | To 100 |

*Minors in the above table includes minor long chain unsaturated fatty acids such as linolenic acid.

The data in the above table 10A and 10B indicates that the soap bars as per the present invention could include up to 15 wt % ricinoleate soap and still give acceptable soap bars.

Examples A, D, E, 1, 4, 19, 20: Effect of Soap Bar Composition on Lather

The following soaps were prepared using the following fat charge as shown in Table-11. Some of the soap bars (A and 1,4) are the same as in Table-1 but are repeated here to demonstrate the effect on lather produced.

TABLE 11

| Examples → Fat charge | A | D | E | 1 | 4 | 19 | 20 |
|---|---|---|---|---|---|---|---|
| Palm oil (IV 55) | 40.0 | 100.0 | 25.0 | — | — | | |
| Palm oil stearin IV 35) | 40.0 | — | 75.0 | — | — | | |
| Palm kernel oil (IV 18) | 20.0 | — | — | — | — | | |
| Capric-Lauric algal oil | — | — | — | — | — | | |
| Lauric acid | — | — | — | — | — | | |
| RBD Soya Bean oil (IV 134) | — | — | — | 22.0 | 25.0 | 20.7 | 32.0 |
| Oleic acid | — | — | — | 8.5 | — | 14.5 | — |
| Fully hydrogenated soya bean oil (IV 0.9) | — | — | — | 69.5 | 75.0 | 64.8 | 68.0 |

The above soaps were formulated along with other ingredients and the formulations are given in the Table-12A below along with the information of the various types of fatty acid soaps present in each (Table-121B).

TABLE 12A

| Ingredient | A | D | E | 1 | 4 | 19 | 20 |
|---|---|---|---|---|---|---|---|
| Soap | 74.01 | 74.04 | 74.04 | 74.61 | 76.99 | 74.61 | 76.01 |
| Chelating agent | 0.06 | 0.06 | 0.06 | 0.06 | 0.06 | 0.06 | 0.06 |
| Sodium chloride | 0.65 | 0.65 | 0.65 | 0.70 | 0.50 | 0.70 | 0.65 |
| Glycerine | 7.65 | 7.65 | 7.65 | 7.00 | 7.00 | 7.91 | 7.65 |
| Free fatty acid (via 0.16% citric acid) | | | | | 0.70 | 0.70 | |
| Sodium citrate | — | — | — | — | 0.21 | 0.21 | — |
| Water, minors | To 100 | To 100 | To 100 | To 100 | To 100 | To 100 | To 100 |

In the above table the chelating agent is a mixture of EHDP+EDTA in a weight ratio of 1:2.

Minors in the above table includes perfume, colour and other minor ingredients like opacifiers.

TABLE 12B

The soap used in the above formulation has the following constitution:

| Ingredient | A | D | E | 1 | 4 | 19 | 20 |
|---|---|---|---|---|---|---|---|
| C16 | 42.00 | 41.00 | 55.00 | 11.60 | 12.40 | 11.0 | 12.20 |
| C18 | 4.70 | 5.00 | 5.00 | 61.00 | 66.10 | 57.0 | 60.40 |
| C8-C12 | 15.28 | 1.44 | 1.68 | 0.33 | 0.13 | 0.46 | 0.12 |
| C18: 1 oleic | 30.8 | 42.17 | 30.80 | 12.00 | 6.00 | 16.00 | 8.23 |
| C18: 2 linoleic | 7.24 | 10.24 | 7.40 | 13.00 | 13.00 | 13.00 | 16.99 |
| Minors* | To 100 | To 100 | To 100 | To 100 | To 100 | To 100 | To 100 |

*Minors in the above table includes minor long chain unsaturated fatty acids such as linolenic acid.

The above soaps bar formulations were passed through an extruder and the extrudability and stamping efficacy were noted to be acceptable. Additionally, the lather generated by the soap bar was measured using the method given below. The data on lather is summarized in the same Table-13 below.

Lather Volume

Lather volume is related to the amount of air that a given soap bar composition is capable of trapping when submitted to standard conditions. Lather is generated by trained technicians using a standardized method given below. The lather is collected and its volume measured.

Apparatus and Equipment:

Washing up bowl—1 per operator capacity 10 liters

Soap drainer dishes—1 per sample

Surgeons' rubber gloves—British Standard BS 4005 or equivalent (see Note 14ii).

Range of Sizes to Fit all Technicians

Tall cylindrical glass beaker—400 mL, 25 mL graduated (Pyrex no 1000)

Thermometer—Mercury types are not approved

Glass rod—Sufficiently long to allow stirring in the glass beaker

Procedure:

Tablet Pre-Treatment:

Wearing the specified type of glove well washed in plain soap, wash down all test tablets at least 10 minutes before starting the test sequence. This is best done by twisting them about 20 times through 180° under running water. Place about 5 liters of water at 30° C. of known hardness (hardness should be constant through a series of tests) in a bowl. Hardness can be measured, for example, in units of French degrees (°fH or °f), which may also be defined as 10 mg/Liter of $CaCO_3$, equivalent to 10 parts per million (ppm). Hardness may typically range from 5 to 60°fH. Tests of the subject invention were conducted at 18° fH. Change the water after each bar of soap has been tested.

Take up the tablet, dip it in the water and remove it. Twist the tablet 15 times, between the hands, through 180°. Place the tablet on the soap dish (see Note).

The lather is generated by the soap remaining on the gloves.

Stage 1: Rub one hand over the other hand (two hands on same direction) 10 times in the same way (see Note).

Stage 2: Grip the right hand with the left, or vice versa, and force the lather to the tips of the fingers.

This operation is repeated five times.

Repeat Stages 1 and 2

Place the lather in the beaker.

Repeat the whole procedure of lather generation from paragraph iii, twice more, combining all the lather in the beaker.

Stir the combined lather gently to release large pockets of air. Read and record the volume.

Calculation & Expression of Results:

The data obtained consists of six results for each bar under test.

Data analysis is carried out by two way analysis of variance, followed by Turkey's Test.

Operators:

Experienced technicians should be able to repeat lather volumes to better than ±10%. It is recommended that technicians be trained until they are capable of achieving reproducible results from a range of different formulation types.

Notes

Water hardness, as noted above, should be constant for a series of tests and should be recorded. Where possible, it is preferable to adhere to suitable water hardness. For example, bars which will be used in soft water markets should ideally be tested with soft water (e.g., lower end of French hardness scale).

It is important to keep the number of rubs/twists constant.

TABLE 13

| Example | A | D | E | 1 | 4 | 19 | 20 |
|---|---|---|---|---|---|---|---|
| Lather volume (ml) | 280 | 193 | 196 | 383 | 378 | 378 | 373 |

The data in the above table indicates that the samples soap bars as per the invention Examples (1, 4, 19, 20) provide vastly superior lather as compared to a conventional bar (Example A). Samples outside the invention (Example D and E where wt ratio of C18:2 to C18:1 is less than 0.7 provide poor lather of less than 200 ml.

The invention claimed is:

1. A composition comprising:

unsaturated C16:2-C18:2 soap; and unsaturated C16:1-C18:1 soap, wherein the composition further comprises C16 to C24 saturated soap;

wherein a weight ratio of C16:2-C18:2 soap to C16:1-C18:1 soap in the composition is higher than 0.7;

comprising 40 to 90 wt % of the saturated soap and less than 30 wt % C18 unsaturated soap based on the % by weight of the composition.

2. The composition as claimed in claim 1, further comprising less than 15% of $C_8$ to $C_{12}$ soap by weight of the composition;

wherein the weight ratio of linoleic acid (C18:2) soap to oleic acid (C18:1) soap is higher than 0.7.

3. The composition as claimed in claim 1, comprising less than 1% $C_8$ to $C_{12}$ soap by weight of the composition.

4. The composition as claimed in claim 1, wherein the weight ratio of linoleic acid soap to oleic acid soap is in the range of 1.0 to 4.0.

5. The composition as claimed in claim 1, wherein the soap comprises stearic acid soap and palmitic acid soap wherein the weight ratio of palmitic acid soap to stearic acid soap is in the range of 1:2 to 5:1.

6. The composition as claimed in claim 1, comprising 60 to 90 wt % of a mixture of palmitic and stearic acid soap.

7. The composition as claimed in claim 1, comprising a combination of sodium and potassium soap, wherein the potassium soap comprises up to 20 wt % of the total amount of soap.

8. The composition as claimed in claim 1, comprising ricinoleic acid (C18:1 OH) soap.

9. The composition as claimed in claim 1, wherein the soap is prepared from soya bean oil.

10. The composition as claimed in claim 1, comprising less than 5 wt % soap prepared from one or more of palm oil, palm kernel oil, coconut oil, tallow, palm olein or palm stearin.

11. The composition as claimed in claim 1, comprising 1 to 10 wt % polyhydric alcohol.

12. A soap bar comprising the composition as claimed in claim 1.

* * * * *